Nov. 12, 1935.  R. B. OLDS  2,020,569
TROMBONE
Filed Dec. 13, 1933
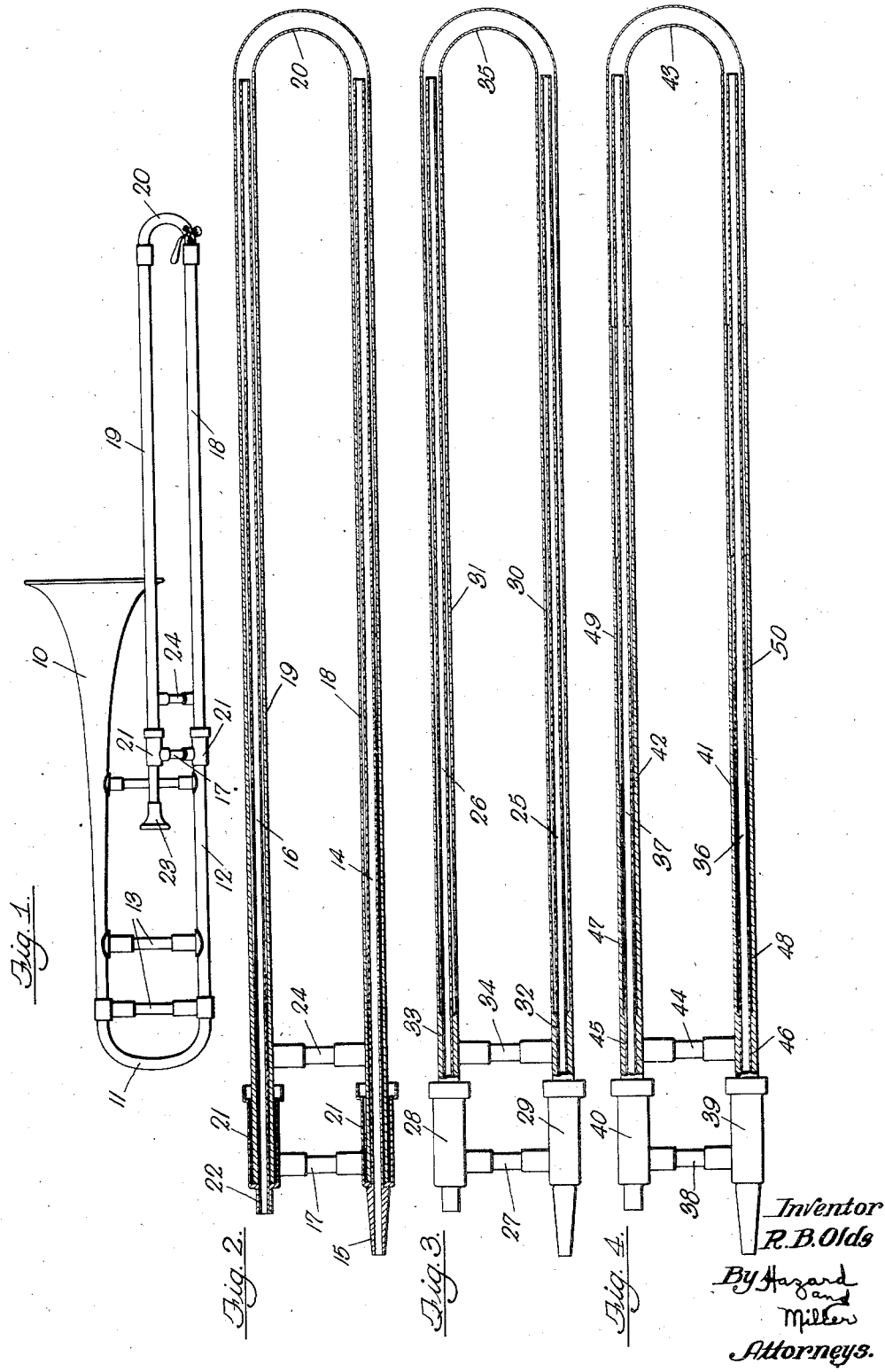
Inventor
R. B. Olds
By Hazard and Miller
Attorneys.

Patented Nov. 12, 1935

2,020,569

UNITED STATES PATENT OFFICE 2,020,569

TROMBONE

Reginald B. Olds, Los Angeles, Calif.

Application December 13, 1933, Serial No. 702,220

2 Claims. (Cl. 84—395)

My invention relates to improvements in musical instruments and particularly to wind instruments. It concerns that class of wind instruments which employ a sliding tube which on its position varied increases or decreases the length of the vibrating column of air formed by the instrument. The invention particularly relates to slide trombones and instruments of like character.

Heretofore, some early German instruments have been made in which there were two stationary tubes over which an outer reverse bend tube telescoped. In these instruments the outside diameter of the stationary tubes was uniform and the inside diameter of the ends or telescoping portions of the outer reverse bend tube was, likewise, made uniform. Where both the inner tubes and outer tubes had uniform outside and inside diameters, respectively, there was a uniform fit throughout the length of these tubes. Consequently, when the outer tube was completely telescoped over the inner tubes there was a greater friction with the outer tube retracted than when extended. To overcome the disadvantages of variations of friction it has been conventional practice for some time to form the ends of the inner tube with a stocking. This stocking is in the form of a thickened portion on each end of each of the inner tubes. This thickened portion was apparent as an increase in exterior diameter for a short distance back from the end of each inner tube. With such a construction the stocking formed the only bearing or close fitting surface on each inner tube which would fit closely to the interior of the outer reverse bend tube. The stocking was intended to render the friction uniform regardless of whether the outer tube were retracted or extended. However, such a construction does not completely overcome the detriment of non-uniform friction. I find that even with the stocking present there is greater friction when the outer tube is completely telescoped or retracted than when the outer tube is extended. This may be due to the fact that although there is a greater clearance between the outer tube and the inner tube at points remote from the stocking oil and condensed moisture between these adjacent surfaces may increase the friction. Also, the handle by which the outer tube is manipulated being conventionally located near the ends of the outer tube may cause the player to impose the weight of his hand on the handle sufficiently so as to cause the outer tube to tend to bind on the stocking when the outer tube is fully retracted, it being understood that there is considerable leverage between the stocking and the handle when the outer tube is in this position.

An object of the present invention is to provide an improved slide trombone construction wherein the friction will be uniform regardless of whether the outer tube is fully retracted, fully extended, or in any intermediate position.

Another object of the invention is to provide a slide trombone wherein the bearing surfaces or places of closest fit between the outer tube and the inner tubes are located near the handle on the outer tube, thus avoiding any tendency toward binding.

With the foregoing and other objects in view, which will be made manifest in the following detailed description, and specifically pointed out in the appended claims, reference is had to the accompanying drawing for an illustrative embodiment of the invention, wherein:

Fig. 1 is a view in side elevation of a slide trombone embodying my invention.

Fig. 2 is a sectional view through the slide, illustrating a preferred form of construction.

Fig. 3 is a section through a slide, illustrating a modified form of construction.

Fig. 4 is a view in section illustrating an alternative form of construction, the details being shown as highly exaggerated so as to bring out clearly the nature of the construction.

Referring to the accompanying drawing, wherein similar reference characters designate similar parts throughout, the general construction of the slide trombone follows conventional practice wherein there is a bell 10 connected by a return bend 11 to a lower stationary tube 12. Brackets or braces 13 connect the bell and the stationary tube 12. An extension 14 has one end tapered as at 15 to provide for attachment to the end of stationary tube 12. This extension constitutes the lower inside stationary tube of the slide. Above the lower stationary inner tube 14 there is disposed an upper stationary inner tube 16 which is parallel and which is secured to the lower stationary tube 14 by means of a bracket 17. The lower stationary inner tube has a lower outside movable tube 18 telescoped thereover and in a similar manner the upper inner tube 16 has an upper outside tube 19 telescoped thereover. The outside movable tubes 18 and 19 are connected to each other by a return bend 20. Sleeves 21 may be mounted around the inner ends of the stationary tubes 14 and 16 which receive the inner ends of the outer tubes 18 and 19 when the outer tubes are in fully retracted positions.

The upper sleeve 21 may provide an extension 22 providing for the attachment of the mouth piece 23. The use of sleeves 21 or their equivalent is optional. Adjacent the inner ends of the outer tubes 18 and 19 these two tubes are connected to each other by means of a handle or hand grip 24, enabling the outer tubes to be manipulated so as to vary their position and thus lengthen or decrease the column of air formed by the instrument which is to be vibrated by the lips of the player. The invention concerns the particular formation of the fitting surfaces between the outer tubes 18 and 19 and their respective inner tubes 14 and 16. As will be noted from Fig. 2, the drawing illustrates the clearances between outer tube 19 and inner tube 16 and a similar clearance between outer tube 18 and its inner tube 14. This clearance is illustrated as somewhat exaggerated and on Fig. 2 it gradually increases from the left hand end of the drawing toward the right hand end.

The tubes 14 and 16 have uniform exterior diameters from one end to the other. The stockings which are conventionally employed at the outer ends of the inner tubes 14 and 16 are left off so that these inner tubes present smooth and truly cylindrical exterior surfaces of uniform diameter from end to end. The outer tubes 18 and 19 present tapered interior surfaces, the arrangement being such that they have minimum internal diameters at the free or inner ends of these outer tubes. This taper of the outer tubes causes the clearance to gradually increase between the outer tubes and their respective inner tubes from the inner ends of the outer tubes toward the outer ends of the inner tubes. Consequently, with this arrangement the closest fit between the outer tubes and their respective inner tubes will always be located at the inner ends of the outer tubes or near handle 24. The greater clearance at other points between the outer tubes and the inner tubes forms a looser fit between the outer tubes and the inner tubes so that at other points which are remote from handle 24 there is virtually no friction between the outer tubes and the inner tubes.

By this arrangement it will be noted that regardless of the position of the outer tubes the friction at all points will be substantially the same. When the outer tubes are fully retracted those portions of the outer tubes which fit most closely about the inner tubes will be only those portions which are adjacent handle 24. Likewise, when the outer tubes are extended the only portions of the outer tubes which bear and closely fit upon the inner tubes will be those portions which are adjacent handle 24. In this way it is possible to have a freely operating slide or bearing of the outer tubes wherein the friction on the inner tubes will be the same in all positions. By having the closet fitting surfaces or the bearing surfaces located very close to handle 24 there is no tendency to cause the outer tubes to bind on their respective inner tubes by the weight of the player's hand or any tendency on his part to move the outer tubes laterally with respect to the inner tubes. This arrangement enables the minimum clearance between the outer tubes to be as close as .005 inch without any danger of sticking or undue friction. In previous constructions which employ stockings on the outer ends of the inner tubes the clearance has seldom, if ever, been allowed to be less than .015 inch.

In Fig. 3 a modified form of construction having the same advantages above described is disclosed. In this construction the inner tubes are indicated at 25 and 26, inner tube 25 constituting the lower inner tube and inner tube 26 constituting the upper inner tube. These inner tubes are connected together by means of a bracket or brace 27 and may have the sleeves 28 and 29. In this construction, also, the inner tubes 25 and 26 have a uniform exterior, truly cylindrical surface from end to end. The outer tubes 30 and 31, instead of presenting tapered interior surfaces are formed with internal stockings at their inner ends, indicated at 32 and 33. The handle 34 connects the inner ends of the outer tubes and is located adjacent the stockings. The stockings may be made to fit the inner tubes with about .005 inch clearance. The remaining portions of the outer tubes to the right of the stockings and extending to the return bend 35 have increased interior diameters forming a greater clearance around the inner tubes and leaving only the stockings 32 and 33 in close engagement therewith. In this type of construction, also, it will be noted that regardless of the position of the outer tubes the only portions of the outer tubes which will engage the inner tubes and produce any friction are the stockings 32 and 33. Consequently, regardless of the positions of the outer tubes or of the slide the friction will always be the same. Likewise, as the stockings are located near handle 34 there is no tendency for the outer tubes to bind on the inner tubes.

In Fig. 4 an alternative form of construction is disclosed. In this construction the instrument has inner tubes 36 and 37 which are connected together by a brace or bracket 38 and may or may not have the sleeves 39 and 40. The outer tubes are indicated at 41 and 42 and are connected by the return bend 43. They have their inner ends connected to each other by means of a handle or hand grip 44. In this construction the inner tubes 36 and 37 present uniform external diameters from end to end so that they are truly cylindrical. The outer tubes are provided with a series of internal stockings, the thickest stockings being those located immediately above and below handle 44. These stockings are indicated at 45 and 46. The stockings 45 and 46 are so formed as to fit the inner tubes most closely. For example, the clearance between these stockings and the inner tubes may be only .005 inch. To the right of these stockings there are additional stockings indicated at 47 and 48. These stockings have a slightly greater clearance; for example: if stockings 45 and 46 fit the inner tubes with .005 inch clearance, stockings 47 and 48 may be .007 inch clearance. Adjacent stockings 49 and 50 may have a still greater clearance, for example: .009 inch clearance. This series of stockings may be formed the entire length of the outer tubes so that there is a progressively increasing clearance from stockings 45 and 46 to return bend 43. In this latter type of construction it will be appreciated that the same advantages are obtainable. The closest fit is located near the handle 44. The closest fit being located at this point, the friction between the outer tubes and their inner tubes will be substantially the same in all positions. There is little or no tendency of the outer tubes to bind on the inner tubes and, consequently, they will slide freely.

In all of the above types of construction it will be appreciated that an improved slide trombone is provided having stationary inner tubes and movable outer tubes connected to each other by a return bend. The outer tubes are telescoped over the inner tubes and the closest fit between the outer tubes and the inner tubes is always located near the inner ends of the outer tubes adjacent the handle.

Various changes may be made by those skilled in the art in the arrangement and construction of parts without departing from the spirit or scope of the invention as defined by the appended claims.

I claim:

1. A slide trombone having stationary inner tubes and movable outer tubes slidably telescoped thereover, a return bend connecting the outer ends of the outer tubes, the inner tubes presenting uniform external diameters, the telescoping lengths of the outer tubes being internally tapered with the smallest internal diameters located adjacent their inner ends.

2. A slide trombone having stationary inner tubes and movable outer tubes slidably telescoped thereover, the inner tubes presenting uniform external diameters, a return bend connecting the outer ends with the outer tubes, the inner ends of the outer tubes having stockings formed on their interiors designed to fit closely around the inner tubes, and a series of adjacent stockings on the interiors of the outer tubes but having greater clearances around the inner tubes than the end most stockings.

REGINALD B. OLDS.